United States Patent
Sakamoto

(10) Patent No.: US 10,090,918 B2
(45) Date of Patent: Oct. 2, 2018

(54) COLLECTIVE ACQUISITION-TYPE PHOTODETECTION DEVICE AND PHOTODETECTION METHOD HAVING A TIME DELAY ADJUSTMENT UNIT WHEREIN EACH TIME-ADJUSTED OPTICAL SIGNAL TRAIN IS PHOTOMIXED WITH AN OPTICAL FREQUENCY COMB AT DIFFERENT TIMINGS IN A PHOTOMIXER

(71) Applicant: NATIONAL INSTITUTE OF INFORMATION AND COMMUNICATIONS TECHNOLOGY, Nukui-Kitamachi, Koganei-shi, Tokyo (JP)

(72) Inventor: Takahide Sakamoto, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 105 days.

(21) Appl. No.: 15/323,728

(22) PCT Filed: Jun. 2, 2015

(86) PCT No.: PCT/JP2015/065892
§ 371 (c)(1),
(2) Date: Jan. 3, 2017

(87) PCT Pub. No.: WO2016/006367
PCT Pub. Date: Jan. 14, 2016

(65) Prior Publication Data
US 2017/0141844 A1 May 18, 2017

(30) Foreign Application Priority Data
Jul. 5, 2014 (JP) .................................. 2014-139223

(51) Int. Cl.
*G01J 11/00* (2006.01)
*H04B 10/079* (2013.01)
(Continued)

(52) U.S. Cl.
CPC ............. *H04B 10/079* (2013.01); *G01J 1/44* (2013.01); *G01J 11/00* (2013.01); *G01J 2001/4238* (2013.01); *G01J 2001/4406* (2013.01)

(58) Field of Classification Search
CPC ...... G01J 11/00; G01J 1/44; G01J 2001/4238; H04B 10/079
(Continued)

(56) References Cited

U.S. PATENT DOCUMENTS 4,959,540 A * 9/1990 Fan ...................... G02B 6/2861
250/227.12

FOREIGN PATENT DOCUMENTS

| JP | 08-062051 A | 3/1996 |
| JP | 2007248660 A | 9/2007 |

OTHER PUBLICATIONS

International Search Report of International Application No. PCT/JP2015/065892 completed Aug. 14, 2015 and dated Sep. 1, 2015 (3 pages).
(Continued)

*Primary Examiner* — Que T Le
(74) *Attorney, Agent, or Firm* — Pyprus Pte Ltd

(57) ABSTRACT

To realize collective measurement of ultrawide-band optical signals which have exceeded an electrical band limit. This photodetection device (100) comprises: a time-delay adjustment means (10) into which is input an optical signal that is a detection object; an optical frequency comb generator (20) that generates an optical frequency comb; a photomixer (30) that photomixes optical signal series which are sequentially
(Continued)

output from the time delay adjustment means (10) and which were subjected to time adjustment, and the optical frequency comb signal which is output from the optical frequency comb generator (20); and a photodetector (40) that detects the mixed signal output from the photomixer (30). The time delay adjustment means (10) performs time adjustment on the optical signal series so that each of the time adjusted optical signal series is photomixed with the optical frequency comb at different timings in the photomixer (30).

5 Claims, 11 Drawing Sheets

(51) Int. Cl.
*G01J 1/44* (2006.01)
*G01J 1/42* (2006.01)

(58) Field of Classification Search
USPC ........................................ 250/227.12, 227.18
See application file for complete search history.

(56) References Cited

OTHER PUBLICATIONS

Takahide Sakamoto, "Multi-Frequency Heterodyne System for All-Optical-Technology-Free Ultrafast Optical Waveform Measurement", 33rd European Conference and Exhibition on Optical Communication—ECOC 2007, 2007, Jun. 29, 1905.

Takahide Sakamoto, "Ultra-fast waveform measurement using ultra-flat optical frequency comb"; Proceedings of The 69th Japan Society of Applied Physics (JSAP) Autumn Meeting, vol. 69th, No. 3, pp. 1045, Sep. 2, 2008.

H. Takara et al, 100Gbit/s optical waveform measurement with 0.6ps resolution optical sampling using subpicosecond supercontinuum pulses, Electronics Letters, 7th vol. 30 No. 141152-1153, Jul. 1994.

M. Westlund et al, Novel technique for polarization independent all-optical sampling in fiber, OFC'04., OWJ3, 2004.

Takahide Sakamoto, Orthogonal Time-Frequency Domain Multiplexing with Multilevel Signaling, Optics Express, vol. 22, Issue 1, pp. 773-781, 2014.

\* cited by examiner

Examples of orthogonalized phase relations of each frequency components of local light emission comb
Illustrates the examples of optical frequency component for two-tone and three-tone

COLLECTIVE ACQUISITION-TYPE PHOTODETECTION DEVICE AND PHOTODETECTION METHOD HAVING A TIME DELAY ADJUSTMENT UNIT WHEREIN EACH TIME-ADJUSTED OPTICAL SIGNAL TRAIN IS PHOTOMIXED WITH AN OPTICAL FREQUENCY COMB AT DIFFERENT TIMINGS IN A PHOTOMIXER

TECHNICAL FIELD

The present invention relates to a photodetection device such as an oscilloscope, and a photodetection method. More specifically, the present invention relates to a photodetection device and a photodetection method, each of which is capable of collectively measuring ultrawide-band optical signals that exceed an electrical band limit.

BACKGROUND ART

In recent years, the feature of multiplexing optical signals is being rapidly promoted. For example, in terms of time domains, optical signal channels, the number of which is approximately 10 to 100, are multiplexed, and an optical transmission rate comes close to a level of 100 Gb/s to several Tb/s. Moreover, attention is also being focused on coherent optical transmission systems such as optical Phase Shift Keying (optical PSK) and optical Quadrature Amplitude Modulation (optical QAM), and on complicated optical multiplicity systems such as optical Orthogonal Frequency Division Multiplexing (optical OFDM) and Optical Code Division Multiplexing (optical OCDM).

Incidentally, with respect to existing optical measurement devices, a practical technique for collectively analyzing and evaluating, for example, a high-speed signal having high optical multiplicity, an optical multiplex signal and a coherent signal, such as those described above, is not established. For example, the conventional wideband optical measurement devices depend on complicated all-optical signal processing techniques based on Second Harmonic wave Generation (SHG), a Four-Wave Mixing (FWM) phenomenon and the like, and therefore it is difficult to practically apply an optical communication network to the conventional wideband optical measurement devices. In addition, analyzing a single channel signal is the best the conventional optical measurement devices can do from a functional point of view as well. Therefore, the conventional optical measurement devices are not suitable for the analysis of an optical multiplex signal that has been highly multi-dimensionally multiplexed on an optical communication network.

CITATION LIST

Non Patent Literature

Non Patent Literature 1: H. Takaraal, Electron. Lett., 1152-1153(1994)
Non Patent Literature 2: M. Westlundetatal., OFC'04., (2004)OWJ3

SUMMARY OF THE INVENTION

Problem to be Solved by the Invention

As described above, at present, optical measurement of ultrahigh-speed ultrawide-band optical signals, which is intended for optical measurement/evaluation techniques for exploring a photophysical phenomenon or for developing an optical device, is realized. However, the prior art depends on complicated all-optical signal processing techniques based on Second Harmonic wave Generation (SHG), a Four-Wave Mixing (FWM) phenomenon and the like, and therefore it is difficult to practically apply an optical communication network to the prior art. In addition, in the prior art, one piece of hardware is capable of analyzing only a single channel signal. Further, the prior art essentially requires high-level techniques such as mode-locked laser, the stable operation of which is difficult. Moreover, these techniques are complicated and expensive, and application ranges thereof are limited to the use of research and development.

In addition, in order to achieve wideband transmission with high spectral efficiency, attention is being given to optical multi-carrier transmission. Such optical multi-carrier transmission uses a multi-carrier optical signal into which a plurality of channels are multiplexed. However, in the case of the optical multi-carrier transmission, a signal is transmitted by a plurality of optical carrier waves, the total bandwidth of which is 100 GHz or more, whereas in the case of the conventional single channel detector, the conventional single channel detector is limited in electrical bandwidth, and therefore is not capable of collectively detecting the wideband optical signals. In order to detect such an ultra-wide-band multi-carrier optical signal, it is, in general, necessary to demultiplex this optical signal into optically low speed subchannels. For example, as a method for demultiplexing and separating a multi-carrier optical signal including subchannels into the subchannels, it is conceived that optical Fast Fourier Transform (FFT) or a filter circuit equivalent thereto is used. However, techniques related to the optical Fast Fourier Transform (FFT) and optical channel selection filters are still in research and development stages, and the practical application of the techniques to the optical multi-carrier transmission is not achieved yet.

Accordingly, an object of the present invention is to enable collective measurement of ultrawide-band optical signals exceeding an electrical band limit without depending on the complicated all-optical signal processing technique, the optical fast Fourier transform and the like.

Solution to Problem

As the result of keen examination of the means for solving the problems of the prior art, the inventor of the present invention decided to apply an optical multi-frequency mixing detection technique in which an optical signal that is a detection object and an optical frequency comb (local comb) output from an optical frequency comb generator are mixed by a photomixer, and the mixed signal is then detected. In other words, the inventor devised a configuration in which an optical signal that is a detection object is time-delayed for time adjustment, and optical signal trains are photomixed with the optical frequency comb with the optical signal trains time-adjusted in such a manner that each of the time-adjusted optical signal trains is photomixed with the optical frequency comb at different timings in the photomixer, thereby successively photodetecting the mixed signal. In addition, the inventor has conceived of being capable of collectively measuring ultrawide-band optical signals exceeding an electrical band limit without depending on the complicated all-optical signal processing technique, the optical fast Fourier transform and the like on the basis of the above knowledge, and has completed the present invention.

A first aspect of the present invention relates to a photodetection device.

A photodetection device according to the present invention is provided with a time delay adjustment unit 10, an optical frequency comb generator 20, a photomixer 30 and a photodetector 40.

When an optical signal that is a detection object is input, the time delay adjustment unit 10 adjusts the delay time of the optical signal.

The optical frequency comb generator 20 generates an optical frequency comb (local comb).

The photomixer 30 photomixes time-adjusted optical signal trains successively output from the time delay adjustment unit 10 with the optical frequency comb signal output from the optical frequency comb generator 20.

The photodetector 40 detects a mixed signal output from the photomixer 30.

In addition, the time delay adjustment unit 10 time-adjusts the optical signal trains in such a manner that each of the time-adjusted optical signal trains is photomixed with the optical frequency comb at different timings in the photomixer 30.

As described in the above configuration, the photodetection device of the present invention inputs an optical signal that is a detection object into the time delay adjustment unit 10, and generates a plurality of optical signal trains (the frequency and the strength are constant) that differ in timing of arrival at the photomixer 30. Subsequently, the photomixer 30 successively mixes each of the time-adjusted optical signal trains with the same optical frequency comb. In this case, the timing in which each of the optical signal trains arrives at the photomixer 30 gradually differs, and therefore the relative time delay (time difference) between each of the optical signal trains and the optical frequency comb also gradually differs. Here, when the optical signal train is mixed with the optical frequency comb, a sampling point is formed in a region in which the amplitude and phase of the optical signal train agree with those of the optical frequency comb, and the sampling point of the optical signal train is detected by the photodetector. Optical detection in such a sampling point is performed for each of the plurality of optical signal trains. Thus, an optical frequency comb capable of covering all bands of an optical signal that is a detection object is generated, and each of the time-adjusted optical signal trains is mixed with the optical frequency comb to successively perform optical detection, thereby eventually enabling to detect and measure optical information such as a waveform over the whole bands of the optical signal that is the detection object. As the result, the photodetection device of the present invention is capable of collective and successive optical detection even in the case of ultrawide-band optical signals beyond the electrical band limit.

In the photodetection device according to the present invention, it is preferable that the time delay adjustment unit 10 include a time gate switch 11 and a loop-type optical fiber delayer 12.

The time gate switch 11 obtains an optical signal train that falls within a predetermined time domain from an optical signal that is a detection object, and then outputs the optical signal train to the photomixer 30.

The loop-type optical fiber delayer 12 circulates the optical signal including a part that has not been obtained by the time gate switch 11 so as to time-delay the optical signal, and inputs the time-delayed optical signal into the time gate switch 11 again.

As described above, the timing in which the optical signal train arrives at the photomixer 30 can be adjusted as appropriate by using the time gate switch 11 and the loop-type optical fiber delayer 12.

In the photodetection device according to the present invention, it is preferable that the photodetector detect frequency differences between components of an optical signal train and components of an optical frequency comb, the optical signal train and the optical frequency comb being included in a mixed signal, so as to obtain an electric signal, the frequency of which is based on the frequency differences.

As described in the above configuration, by obtaining the electric signal on the basis of the frequency differences between components of the optical signal train and components of the frequency comb, the optical signal train and the optical frequency comb being included in the mixed signal, an electric signal that is bandwidth compressed more highly than the optical signal that is the detection object can be obtained. Therefore, even when a bandwidth of the optical signal as the detection object exceeds a limit of a bandwidth that can be detected by the photodetector, this photodetector is capable of collectively obtaining optical signals each having a wide bandwidth.

In the photodetection device according to the present invention, it is preferable that the number of the photomixer 30 into which an optical signal train output from the time delay adjustment unit 10 is input, and the number of the photodetector 40 into which a mixed signal output from the photomixer 30 is input, be both one.

When ultrawide-band optical signals are detected, it is also possible to cover all bands of the optical signals by providing a plurality of photomixers, photodetectors, optical frequency comb generators and the like. However, if the plurality of photomixers, photodetectors and the like are provided, the size of a receiving part of the photodetection device gets larger. Accordingly, in the photodetection device according to the present invention, it is preferable that the detection of ultrawide-band optical signals be achieved by a simple configuration in which the number of the photomixers 30 and the number of the photodetectors 40 are both one. In this respect, the photodetection device according to the present invention uses the time delay adjustment unit 10 to adjust the timing in such a manner that optical signal trains are introduced into the photomixer 30 in order, and therefore ultrawide-band optical signals can be collectively obtained by one photomixer 30 and one photodetector 40.

A second aspect of the present invention relates to a photodetection method.

A photodetection method according to the present invention comprises the steps of: inputting an optical signal that is a detection object into a time delay adjustment unit 10; generating an optical frequency comb by an optical frequency comb generator 20; photomixing, by a photomixer 30, time-adjusted optical signal trains successively output from the time delay adjustment unit 10 with an optical frequency comb signal output from the optical frequency comb generator 20; and detecting, by a photodetector 40, a mixed signal output from the photomixer 30.

Here, the time delay adjustment unit 10 time-adjusts the optical signal trains in such a manner that each of the time-adjusted optical signal trains is photomixed with the optical frequency comb at different timings in the photomixer 30.

Advantageous Effects of Invention

According to the present invention, ultrawide-band optical signals exceeding an electrical band limit can be collectively measured without depending on the complicated all-optical signal processing technique, the optical fast Fourier transform and the like.

BRIEF DESCRIPTION OF THE DRAWINGS

FIG. 1 shows the principle applied when an optical signal train is resolved into wavelength domains.

FIG. 3 illustrates a case where an optical signal train is resolved into time-frequency domains.

DESCRIPTION OF EMBODIMENTS

Hereinafter, embodiments for carrying out the present invention will be described with reference to the accompanying drawings as below. The present invention is not limited to the embodiments described below, but includes various modifications and changes made as appropriate from the undermentioned embodiments within the scope obvious to those skilled in the art.

1. Basic Principles

Figure 1:
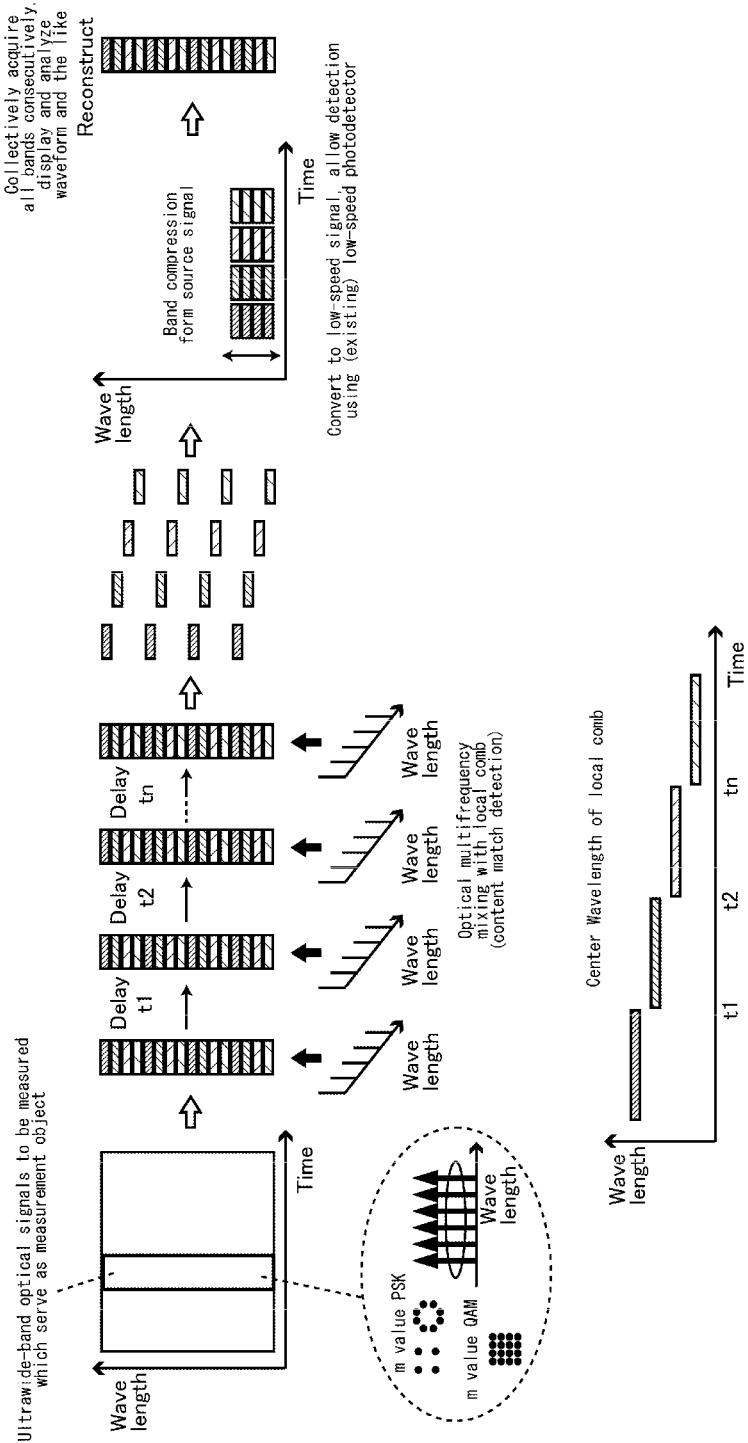
FIG. 1 is a conceptual diagram illustrating the basic principle of a photodetection device according to the present invention. In particular.
Figure 2:
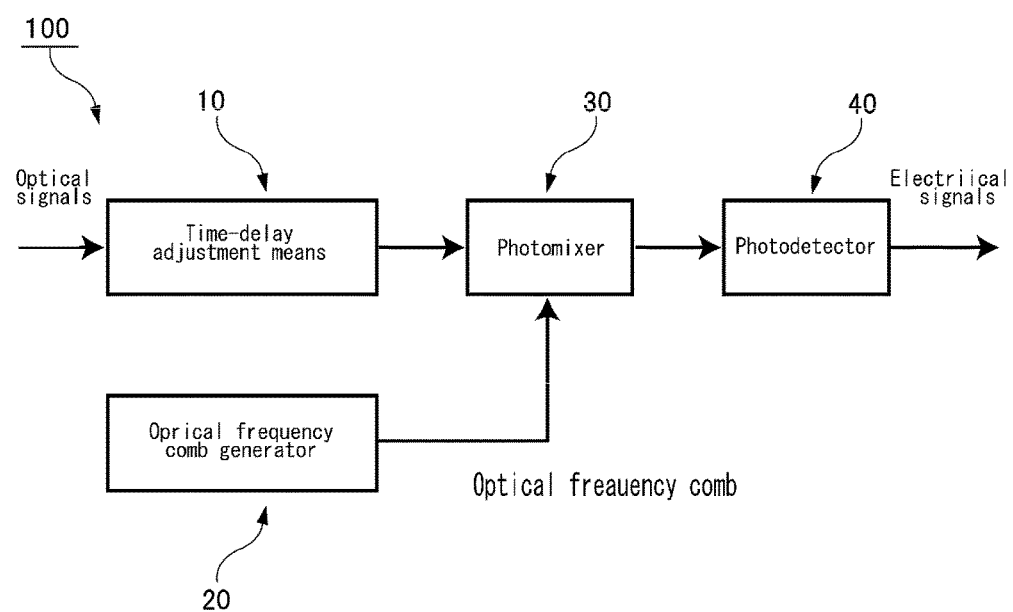
FIG. 2 is a block diagram illustrating a function of the photodetection device according to the present invention.

FIG. 1 schematically illustrates the principles of a photodetection device and a photodetection method according to the present invention. In addition, FIG. 2 illustrates a functional block of the photodetection device. First of all, the basic principles of the present invention will be described with reference to FIG. 1 and FIG. 2. As shown in FIG. 2, a photodetection device 100 is provided with a time delay adjustment unit 10, an optical frequency comb generator 20, a photomixer 30 and a photodetector 40.

An optical signal that is a detection object is input into the time delay adjustment unit 10. The photodetection device 100 according to the present invention is capable of detecting ultrawide-band optical signals. For example, an m-value PSK signal, an m-value QAM signal, and other multi-carrier signals are mentioned as examples of the ultrawide-band optical signals. For example, a band of an optical signal input into the time delay adjustment unit 10 may be twice or more the band limit that can be detected by the photodetector 40, or may be four times or more, eight times or more, or ten times or more the band limit. Thus, the photodetection device 100 according to the present invention is capable of detecting and measuring even an optical signal having a band that exceeds a detection limit of the photodetector 40.

As shown in FIG. 1 and FIG. 2, when an optical signal is input into the time delay adjustment unit 10, the time delay adjustment unit 10 successively outputs the optical signal at different timings with the optical signal time-delayed. For example, in an example shown in FIG. 1, a plurality of sets of optical signal trains output from the time delay adjustment unit 10 are subjected to time delays of t1, t2, . . . tn, respectively. In addition, as shown in FIG. 2, the photomixer 30 is provided on the output side of the time delay adjustment unit 10. In other words, the plurality of sets of optical signal trains output from the time delay adjustment unit 10 arrive at the photomixer 30 at different timings, respectively.

As shown in FIG. 2, the photomixer 30 photomixes the output from the time delay adjustment unit 10 with the output from the optical frequency comb generator 20. The optical frequency comb generator 20 consecutively generates an optical frequency comb (local comb). The optical frequency comb is constituted of a plurality of optical frequency components having frequency differences at regular intervals. Therefore, when the plurality of sets of optical signal trains that have been time-adjusted by the time delay adjustment unit 10 arrive at the photomixer 30, the optical signal trains are photomixed with the optical frequency comb at different timings, respectively. In this case, the timing in which each of the optical signal trains arrives at the photomixer 30 gradually differs, and therefore the relative time delay (time difference) between each of the optical signal trains and the optical frequency comb also gradually differs.

In the principle shown in FIG. 1, each optical signal train is mixed with the optical frequency comb to resolve the each optical signal train into individual wavelength domains. In other words, as shown in FIG. 1, when each optical signal train is wavelength-resolved, a wavelength of a local comb is shifted in time to sample and detect individual different frequency components of the each optical signal train. Shifting the wavelength of the local comb enables to cover the whole bands of the optical signal train. Each of the optical signal trains is mixed with the optical frequency comb. However, as shown in FIG. 1, the plurality of frequency combs to be mixed with the respective optical signal trains gradually differ in central wavelength in terms of time. Therefore, when each optical signal train is mixed with the optical frequency comb, a sampling point is formed in a region in which the amplitude and phase of the optical signal train agree with those of the optical frequency comb. As the result, as shown in FIG. 1, sampling points are extracted in bands, the wavelengths of which gradually differ, in each optical signal train. In addition, integrating all sampling points of all of the optical signal trains enables to cover the whole bands of the ultrawide-band optical signals as the measuring object.

In addition, as shown in FIG. 1, only some sampling points are extracted from one optical signal train, and therefore when sampling points of each optical signal train are integrated, the band thereof is highly compressed in comparison with the band of the original optical signal. Moreover, a plurality of sets of optical signal trains arrive at the photodetector 40 at different timings, respectively. Therefore, the photodetector 30 is capable of successively detecting the band-compressed optical signal trains. In other words, the photodetector 30 does not need to concurrently detect ultrawide-band optical signals, but has only to consecutively detect a plurality of band-compressed optical signal trains in order. Thus, the ultrawide-band optical signals as a measuring object pass through the time delay adjustment unit 10 and the photomixer 30 (the optical frequency comb generator 20), are consequently resolved into individual wavelength domains, and are then introduced into the photodetector 40 in a highly band-compressed state. Therefore, even when ultrawide-band optical signals are detected, the photodetector 40 is allowed to use an existing low-speed photodetector.

Subsequently, the optical signals as the measuring object are converted into electric signals by the photodetector 40. The optical signals are resolved into two or more sets of optical signal trains, and are band-compressed. However, after the optical signals are converted into the electric signals, by analyzing the electric signals using predetermined algorithms, the signals are reconstructed into a state before resolving and compressing the optical signals (an ultrawide-band state). The algorithms for the reconstruction may be designed as appropriate. The reconstructed ultrawide-band electric signals are subsequently used as signals for analyzing waveforms and the like of the optical signals as the measuring object. As the result, the photodetection device 100 according to the present invention is capable of consecutively and collectively obtaining all bands of the ultrawide-band optical signals, and analyzing optical information such as the waveforms thereof. The analyzed information such as waveforms can be displayed on a publicly-known display unit or the like.

Figure 3:
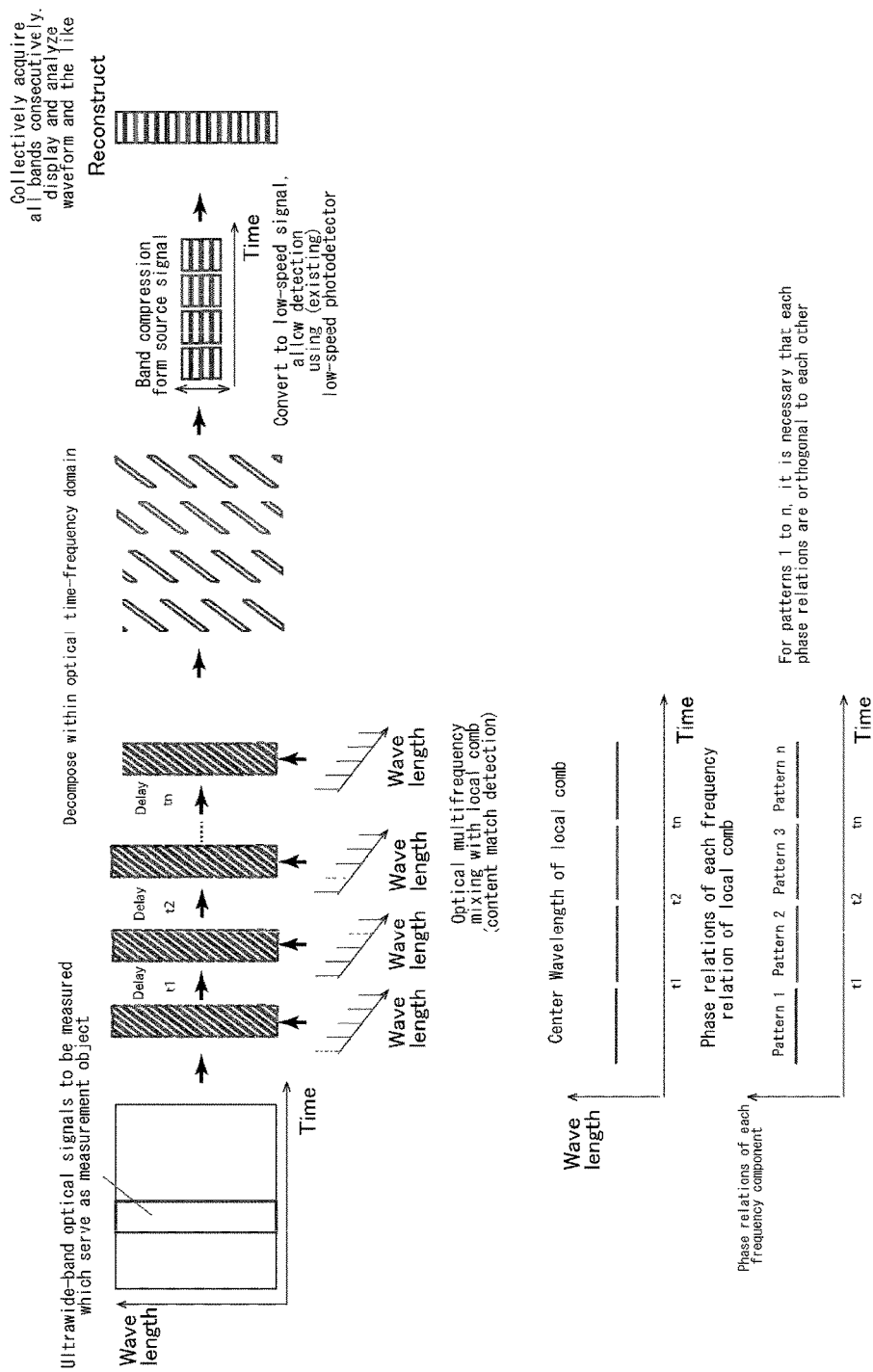
FIG. 3 is a conceptual diagram illustrating an application example of the photodetection device according to the present invention. In particular.

FIG. 3 schematically illustrates an application example of a photodetection device and a photodetection method according to the present invention. More specifically, as a method in which each optical signal train successively output from the time delay adjustment unit 10 is mixed with an optical frequency comb to resolve the optical signal train, other than the method in which each optical signal train is resolved into individual wavelength domains as described above (refer to FIG. 1), it is possible to conceive of a method in which each optical signal train is resolved into individual time domains, and a method in which each optical signal train is resolved into individual time-frequency domains. FIG. 3 illustrates, in particular, an example of the method in which each optical signal train is resolved into individual time-frequency domains.

Figure 4:
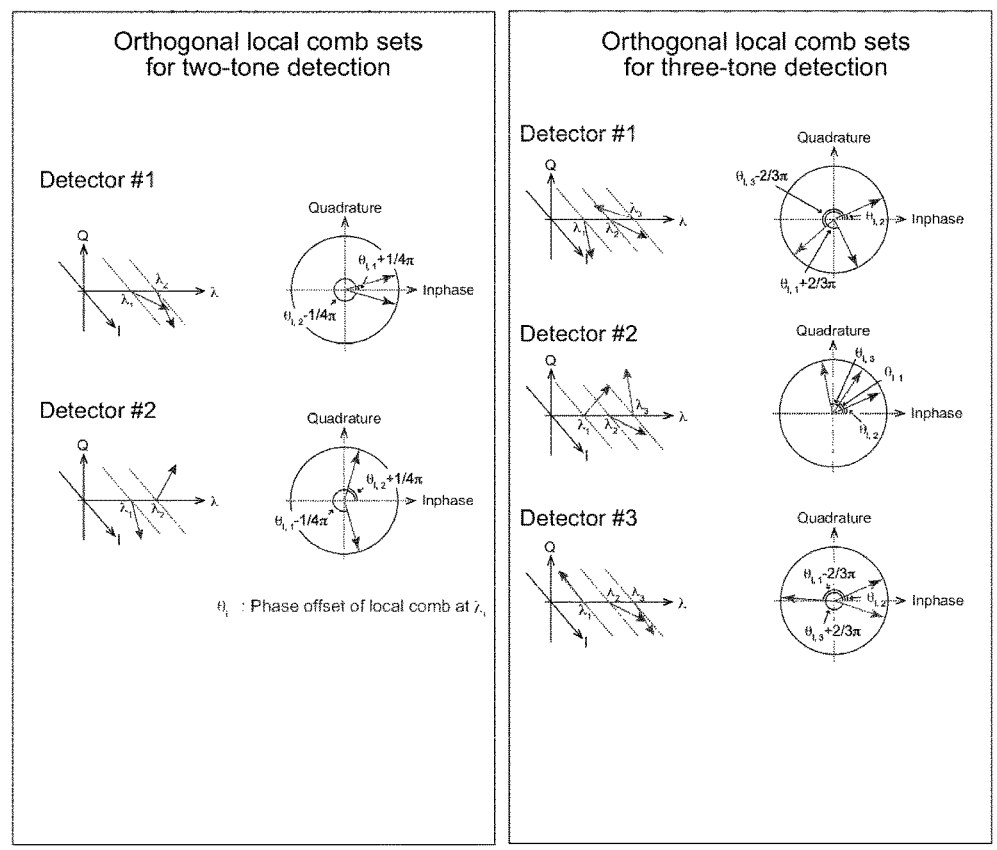
FIG. 4 illustrates an example of the orthogonal phase relationship between frequency components of a local comb in the application example shown in FIG. 10.

As shown in FIG. 3, with respect to the method in which each optical signal train is resolved into individual time-frequency domains, the feature wherein the time delay adjustment unit 10 changes the timing in which each optical signal train arrives at the photomixer 30 is similar to that in the method in which each optical signal train is resolved into individual wavelength domains described above (refer to FIG. 1). Meanwhile, with respect to the method in which each optical signal train is resolved into individual time-frequency domains, a wavelength of an optical frequency comb (local comb) may be constant with respect to the time differently from the method in which each optical signal train is resolved into individual wavelength domains described above. In other words, the wavelength of the optical frequency comb may be always constant. However, the method in which each optical signal train is resolved into individual time-frequency domains requires that the phase relationship between optical frequency combs to be mixed with optical signal trains be an orthogonal relationship in which phases of the optical frequency combs are orthogonal to each other. It can be said that optical frequency combs that are in the orthogonal relationship in which phases of the optical frequency combs are orthogonal to each other mean a relationship in which multi-frequency mixing (photomixing) is performed between two optical frequency combs, and when a signal is passed through a sufficiently narrow band low-pass filter, the band of which is a half or less the frequency interval of the optical frequency combs, an output level of the signal becomes 0 (approaches 0 limitlessly). FIG. 4 illustrates an example in which optical frequency combs have the orthogonal phase relationship in which phases of the optical frequency combs are orthogonal to each other. The left side of FIG. 4 shows a case where the number of optical frequency components constituting an optical frequency comb is two; and the right side of FIG. 4 shows a case where the number of optical frequency components constituting an optical frequency comb is three. More specifically, the left side of FIG. 4 shows a state in which two optical frequency combs, each of which is constituted of two optical frequency components, are in a relationship in which phases of the two optical frequency combs are orthogonal to each other. In addition, the right side of FIG. 4 shows a state in which two optical frequency combs, each of which is constituted of three optical frequency components, are in a relationship in which phases of the two optical frequency combs are orthogonal to each other.

As shown in FIG. 3, maintaining the phase relationship between optical frequency combs to be mixed with optical signal trains in a state in which phases of the optical frequency combs are orthogonal to each other enables to resolve each optical signal train into individual time-frequency domains. A plurality of sampling points are obtained on an optical signal train basis in this manner. Bands of the sampled optical signal trains are highly compressed in comparison with the band of the original optical signal. Moreover, a plurality of sets of optical signal trains arrive at the photodetector 40 at different timings, respectively. Therefore, the photodetector 30 is capable of successively detecting the band-compressed optical signal trains. In other words, the photodetector 30 does not need to concurrently detect ultrawide-band optical signals, and has only to consecutively detect a plurality of band-compressed optical signal trains in order. Therefore, even when ultrawide-band optical signals are detected, the photodetector 40 is allowed to use an existing low-speed photodetector.

2. Embodiments 2-1. Overall Configuration of Embodiment

Next, one embodiment of the photodetection device 100 according to the present invention will be described with reference to FIG. 5.

Figure 5:
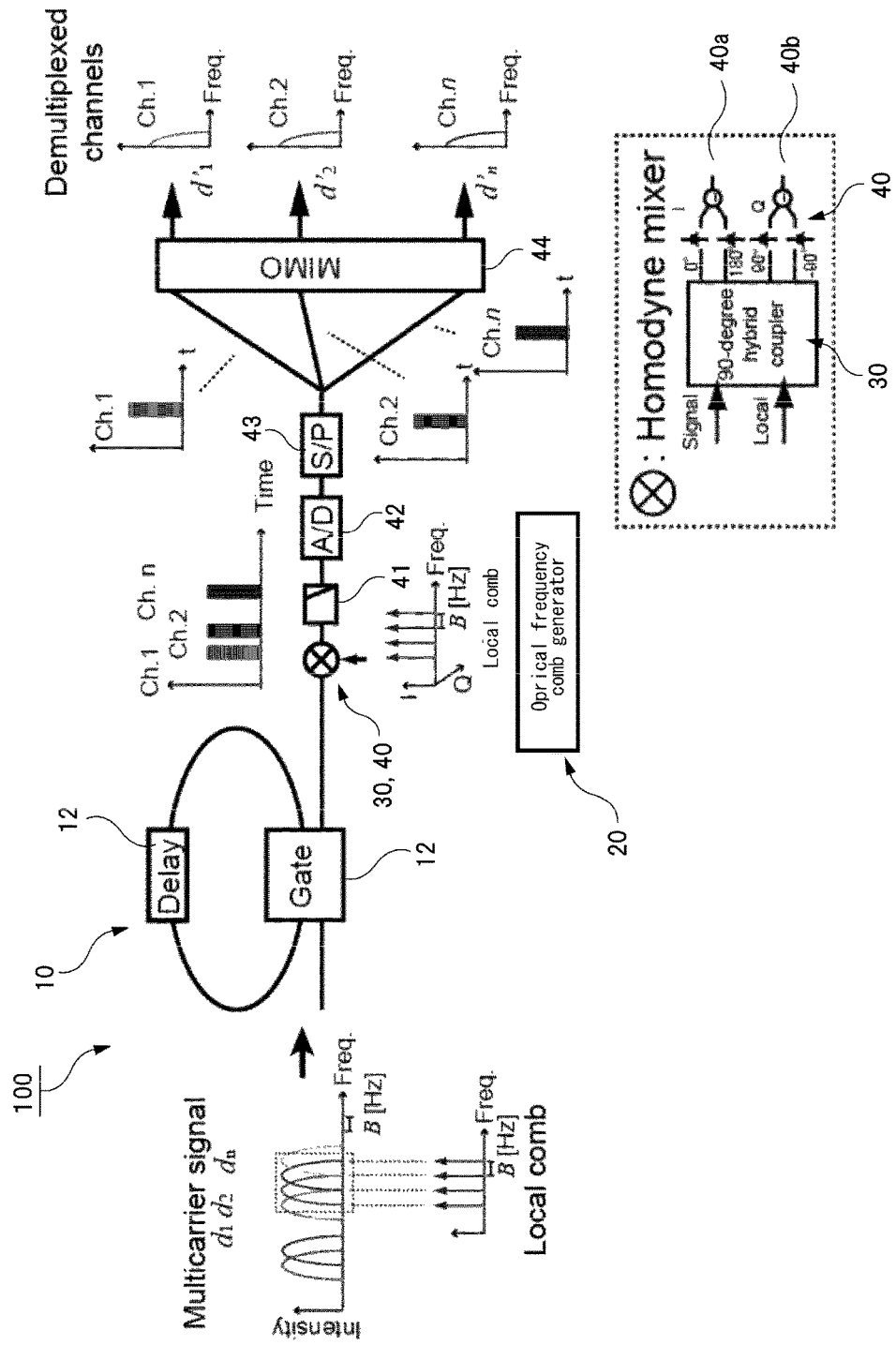
FIG. 5 illustrates one embodiment of the photodetection device according to the present invention.

FIG. 5 illustrates a configuration of the photodetection device 100 that uses the above-described basic principles. As shown in FIG. 5, in the present embodiment, a multi-carrier optical signal is input into the photodetection device 100 as an optical signal that is a detection object. FIG. 5 illustrates, as an example of the multi-carrier optical signal, a signal of OFDM (Orthogonal Frequency-Division Multiplexing) method in which a plurality of QPSK signals are arranged on a frequency axis at regular intervals. The photodetection device 100 according to the present invention is capable of detecting ultrawide-band optical signals such as an OFDM-QPSK signal.

As shown in FIG. 5, the photodetection device 100 according to the present embodiment includes the time delay adjustment unit 10, the optical frequency comb generator 20, the photomixer 30, the photodetector 40, a low-pass filter 41, an A/D (analogue/digital) converter 42, and a S/P (serial/parallel) converter 43. In addition, the optical frequency comb generator 20, the photomixer 30 and the photodetector 40 constitute an optical multi-frequency mixing detector.

First of all, a multi-carrier optical signal that is a measuring object is input into the time delay adjustment unit 10. In the present embodiment, the time delay adjustment unit 10 is composed of the time gate switch 11 and the loop-type optical fiber delayer 12. The time gate switch 11 extracts a desired time domain from among time domains of the input multi-carrier optical signal, and is controlled to pass an optical signal that falls within a required time domain, and not to pass optical signals that fall within the remaining time domains. Therefore, when a multi-carrier optical signal is input into the time gate switch 11, the time gate switch 11 obtains an optical signal train belonging to a predetermined time domain from the multi-carrier optical signal, and then transmits the optical signal train to the photomixer 30 in the subsequent stage. Meanwhile, the multi-carrier optical signal that has not been obtained by the time gate switch 11 is introduced into the loop-type optical fiber delayer 12. The loop-type optical fiber delayer 12 has a configuration in which, for example, a single mode optical fiber (SMF) having a length of 50 m to 1000 m is looped in a multiple manner. The multi-carrier optical signal that has been introduced into the loop-type optical fiber delayer 12 is circulated in a loop structure so as to be delayed for a predetermined time period, and is then input into the time gate switch 11 again. When the multi-carrier signal that has been circulated in the loop is input into the time gate switch 11, the time gate switch 11 obtains an optical signal train belonging to a predetermined time domain from the multi-carrier optical signal again to transmit the obtained optical signal train to the photomixer 30 in the subsequent stage. Meanwhile, the multi-carrier optical signal that has not been obtained by the time gate switch 11 is introduced into the loop-type optical fiber delayer 12 again. The time gate switch 11 repeatedly performs such loop circulation, thereby time-adjusting each optical signal train to be output to the photomixer 30. As the result, the multi-carrier optical signal that is the measuring object is resolved into two or more sets of time-adjusted optical signal trains in the time delay adjustment unit 10. The two or more sets of time-adjusted optical signal trains differ in timing of arrival at the photomixer 30. Incidentally, the delayer for delaying the optical signal is not limited to the loop-type optical fiber delayer, and a publicly-known delayer can be used as appropriate.

Meanwhile, the optical frequency comb generator 20 generates an optical frequency comb. The optical frequency comb is a signal composed of a plurality of optical frequency components that are arranged at equal frequency intervals. The optical frequency comb generated by the optical frequency comb generator 20 is also called a local comb. The optical frequency comb generated by the optical frequency comb generator 20 is input into the photomixer 30, and is then photomixed with an optical signal train that has been time-adjusted by the time delay adjustment unit 10. It is preferable that the optical frequency comb generator 20 has a structure that uses a Mach-Zehnder optical modulator, and is capable of generating an optical frequency comb having the constant and flat light intensity. When the photodetection device 100 resolves each optical signal train into individual wavelength domains, the optical frequency comb generator 20 shifts a wavelength of the local comb in time, enabling to cover the whole bands of the optical signal train (refer to FIG. 1). In contrast, when the photodetection device 100 resolves each optical signal train into individual time-wavelength domains, a wavelength of a local comb generated by the time optical frequency comb generator 20 may be constant with respect to the time (refer to FIG. 3). However, when each optical signal train is resolved into individual time-frequency domains, it is preferable that the phase relationship between optical frequency combs to be mixed with optical signal trains be an orthogonal relationship in which phases of the optical frequency combs are orthogonal to each other. Incidentally, the optical frequency comb generator 20 may be configured by other publicly-known comb generators. A preferred form of the optical frequency comb generator 20 will be detailed later.

As described above, two or more sets of time-adjusted optical signal trains are input into one input port of the photomixer 30 in order, and an optical frequency comb is input into the other input port of the photomixer 30. The photomixer 30 photomixes each of the optical signal trains with the optical frequency comb to sample the optical signal train on the basis of wavelength domains or time-frequency domains. In addition, the time adjustment unit 10 time-adjusts the two or more sets of optical signal trains in such a manner that the optical signal trains gradually differ in timing of arrival at the photomixer 30. Therefore, each of the time-adjusted optical signal trains is photomixed with the optical frequency comb at different timings in the photomixer 30. As the result, the two or more sets of optical signal trains are sampled at different points by the optical frequency comb. Thus, the technique in which an optical signal as a measuring object is mixed with an optical frequency comb to perform high bandwidth optical sampling is referred to as "multi-frequency mixing detection" here. In addition, if the optical frequency comb covers all bandwidths of the multi-carrier optical signal that is the measuring object, integrating sampling points obtained by mixing each of the optical signal trains with the optical frequency comb enables to obtain the whole bands of the multi-carrier optical signal. Integrating sampling points of each of the optical signal trains enables to obtain subchannels (Ch. 1, Ch. 2, Ch. n) corresponding to respective subcarriers (d1, d2, dn) included in the multi-carrier signal that is the measuring object.

After the time-adjusted optical signal train is mixed with the optical frequency comb by the photomixer 30, the mixed signal is input into the photodetector 40. The photodetector 40 generates an electronic signal from the mixed signal that is an optical signal. In the present embodiment, the multi-carrier optical signal that is the measuring object is formed of a QPSK signal. Therefore, a balanced detector capable of properly demodulating the QPSK signal is used as the photodetector 40. A publicly-known balanced detector may be used as the balanced detector for demodulating the QPSK signal. For example, the balanced detector includes a first balanced detection unit 40a that obtains an electric signal corresponding to an I (In-phase) component from among components of the mixed signal output from the photomixer 30 (90° hybrid coupler), and a second balanced detection unit 40b that obtains an electric signal corresponding to a Q (Quadrature) component from among the components of the mixed signal. The first balanced detection unit 40a subjects the mixed signal to balanced detection to obtain a component having a phase of 0° and a component having a phase of 180° therefrom, and then performs optical-electric conversion to obtain an electric signal corresponding to the I component. In addition, the second balanced detection unit 40b subjects the mixed signal to balanced detection to obtain a component having a phase of 90° and a component having a phase of −90° therefrom, and then performs optical-electric conversion to obtain an electric signal corresponding to the Q component.

According to the present invention, using the optical multi-frequency mixing detection technique based on photodetection by optical sampling that mixes an optical signal with an optical frequency comb enables band compression of a wideband optical signal to down-convert the optical signal into an electric signal having a low-rate RF frequency. In other words, the photodetector 40 obtains frequency differences between the optical signal and the frequency comb that have been input into the photomixer 30, thereby enabling to obtain an electric signal having an RF frequency based on the frequency differences. The optical multi-frequency mixing detection technique will be detailed later.

The low-pass filter 41 removes unnecessary noise components from the electric signal obtained by the photodetector 40, and the electric signal is then input into an A/D converter to convert the electric signal into a digital signal. An S/P converter converts the digital signal from serial transmission to parallel transmission, and each signal component is then input into a MIMO detector 44. For example, electric signals of subchannels (Ch. 1, Ch. 2, Ch. n) corresponding to respective subcarriers (d1, d2, dn) of the multi-carrier optical signal are input into the MIMO detector 44 in parallel. The subchannels demultiplexed from the multi-carrier signal optical signal can be obtained in this manner. Separating the subchannels by the MIMO detector 44 enables to cancel residual crosstalk remaining between subchannels included in a received signal. Subsequently, analyzing each subchannel enables to obtain the measurement result of optical information such as the waveform, phase and the like of the multi-carrier optical signal.

Next, settings of preferable time delay in the time delay adjustment unit 10 will be described.

As shown in FIG. 5, the multi-carrier signal that is the measuring object is input into the time delay adjustment unit 10, which is provided with the time gate 11 and the loop-type optical fiber delayer 12, before the signal is input into the optical multi-frequency mixing detector (20, 30, 40). The optical signal trains that have been time-adjusted by the time gate 11 and the loop-type optical fiber delayer 12 arrive at an input port of the photomixer 30 of the optical multi-frequency mixing detector at different timings.

Here, in a case where each optical signal train is resolved into individual time-frequency domains, it is preferable that a time delay in the loop-type optical fiber delayer 12 be set at (m+i/n)/B [sec] in order to maintain the orthogonality of the optical frequency comb to be mixed with each time-adjusted optical signal train. B is a symbol rate [sps: symbol/sec] of each of subchannels that constitute a multiplexed optical signal. m is an arbitrary integer. n is the number of multiplexed subchannels. i is the order (sequence number) of the time-adjusted optical signal train. In such conditions, a relative time delay (time difference) between the i-th optical signal train that has been time-adjusted and the optical frequency comb (local comb) is represented by i/(nB). Consequently, the photodetector detects the time-adjusted optical signal by multi-frequency mixing by using local combs that have a phase relationship in which phases of the local combs are orthogonal to each other.

As the result of time-delaying each optical signal train so as to satisfy the above conditions, the each optical signal train arrives at the photomixer 30 in the proper timing, which eliminates the need for the precise control of the optical frequency generator 20 for generating a local comb.

For example, when a local comb is generated from the optical frequency generator 20, it is not necessary to perform control that successively adjusts a phase state of the local comb. In addition, each of optical frequency components that constitute a local comb may have an arbitrary phase, and it is not always necessary to make phases of all optical frequency components uniform (for example, made 0). Therefore, only one optical frequency generator 20 can sufficiently support the requirements. Moreover, by time-delaying each of the optical signal trains so as to satisfy the above conditions, and by mixing each of the time-adjusted optical signal trains with a local comb to perform photodetection, the amplitudes and phases of all optical signal trains can be collectively obtained.

In addition, by using digital signal processing to apply an n×n matrix to the optical signal train detected by multi-frequency mixing, all subchannels can be demultiplexed and obtained from n sets of optical signal trains. Moreover, properly selecting matrix elements according to a kind of a multi-carrier optical signal (kind of modulation) enables the photodetection device 100 having the time delay adjustment unit 10 to detect any kind of multi-carrier signal within a nf[Hz] bandwidth. Furthermore, an MIMO equalization technique for cancelling crosstalk between subchannels also has an advantage of adaptively updating matrix elements. Furthermore, the detection method according to the present invention does not depend on optical Fast Fourier Transform (FFT) and an optical channel selection filter at the time of demultiplexing, and therefore is capable of collectively detecting ultrawide-band optical signals by using a general photodetector having the low wavelength detection performance.

2-2. Optical Frequency Comb Generator

Figure 6:
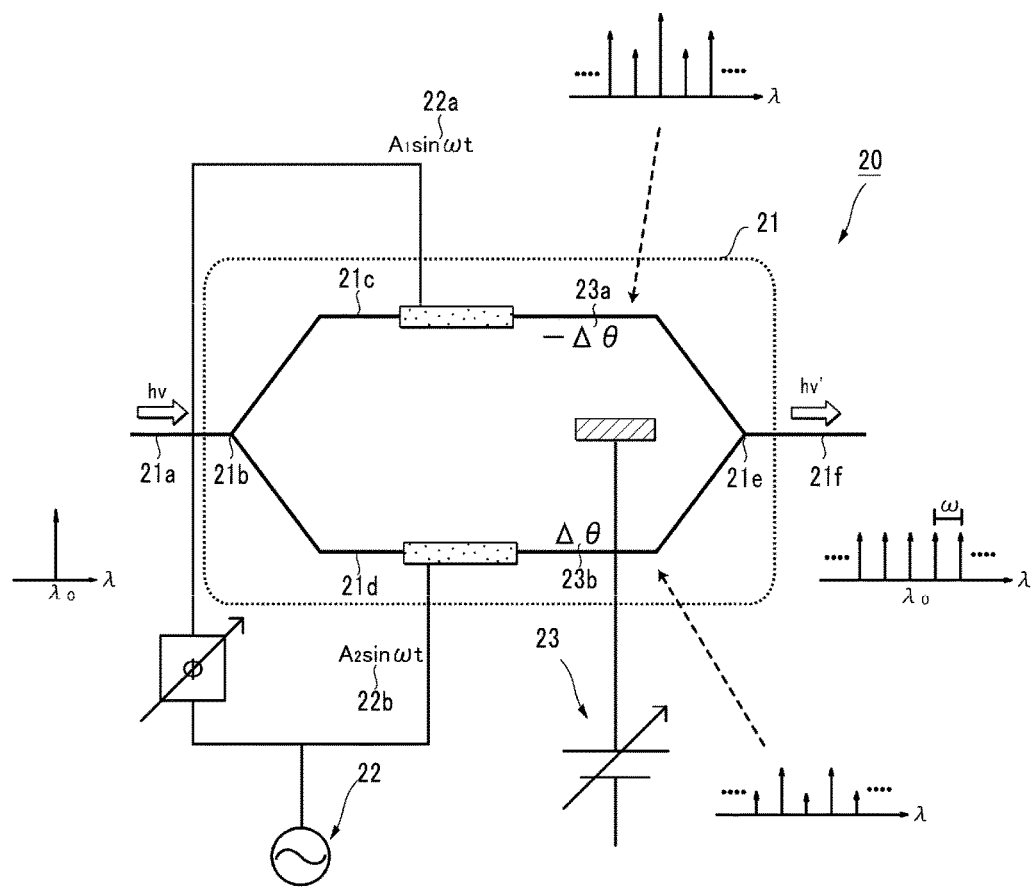
FIG. 6 illustrates a preferred form of an optical frequency comb generator.

Subsequently, a preferred form of the optical frequency comb generator 20 will be specifically described. FIG. 6 is a schematic diagram of the optical frequency comb generator 20. As shown in FIG. 6, it is preferable that the optical frequency comb generator 20 of the photodetection device 100 according to the present invention use a Mach-Zehnder optical modulator. As the optical frequency comb generator 20 that uses such a structure, for example, the optical frequency comb generator disclosed in Unexamined Japanese Patent Publication No. 2007-248660 can be employed. However, as the optical frequency comb generator 20 of the photodetection device 100 according to the present invention, a publicly-known comb generator can be employed as appropriate so long as the comp generator is capable of generating an optical frequency comb.

As shown in FIG. 6, the optical frequency comb generator 20 is provided with a waveguide section 21, a driving signal system 22 and a bias signal system 23.

The waveguide section 21 includes an input part 21a, a branch part 21b, a first waveguide 21c, a second waveguide 21d, a multiplexing part 21e and an output part 21f. First of all, an optical signal is input into the input part 21a, and the optical signal is then branched at the branch part 21b. One of the optical signals branched at the branch part 21b propagates through the first waveguide 21c, and the other of the optical signals branched at the branch part 21b propagates through the second waveguide 21d. Optical signals output from the first waveguide 21c and the second waveguide 21d are multiplexed at the multiplexing part 21e, and the multiplexed optical signal is then output from the output part 21f. In addition, the driving signal system 22 generates a first driving signal 22a for driving the first waveguide 21c, and a second driving signal 22b for driving the second waveguide 21d. Further, the bias signal system 23 generates bias signals 23a, 23b to be applied to the first waveguide 21c and the second waveguide 21d, respectively.

Moreover, it is preferable that the driving signal system 22 and the bias signal system 23 be driven in such a manner that the first driving signal 22a, the second driving signal 22b, and the bias signals 23a, 23b satisfy the following formula (I):

$$\Delta A + \Delta \theta = \pi/2 \qquad (I)$$

In the above formula (I), $\Delta A$ and $\Delta \theta$ are defined as $\Delta A \equiv (A1-A2)/2$, and $\Delta \theta \equiv (\theta 1-\theta 2)/2$, respectively. A1 and A2 indicate amplitudes of optical phase shifts induced by the first driving signal 22a and the second driving signal 22b when the first driving signal 22a and the second driving signal 22b are input into electrodes, respectively. $\theta 1$ and $\theta 2$ indicate amounts of optical phase shifts induced by an optical path length difference and a bias signal in the first waveguide 21c and the second driving signal 22b, respectively.

In other words, the optical frequency comb generator 20 is equipped with: the driving signal system 22 that drives the first driving signal 22a, the second driving signal 22b, and the bias signals 23a, 23b so as to satisfy the conditions of the above formula (I); and the bias signal system 23. In addition, the driving control may be carried out by a control unit such as a computer, the control unit being included in a signal system or being mounted to the signal system.

As shown in FIG. 6, the optical frequency comb generator 20 uses a Mach-Zehnder optical modulator, and, in principle, has a structure in which two phase modulators are combined, each of the phase modulators being composed of a waveguide, and an electrode to which a driving signal is applied. In addition, driving the driving signal system 22 and the bias signal system 23 so as to satisfy the conditions of the above formula (I) causes optical signals from the two phase modulators, which are multiplexed at the multiplexing part 21e of the waveguide section 21, to complement each other. Therefore, the optical frequency comb generator 20 is capable of stably obtaining an optical frequency comb having flat spectral characteristics.

Moreover, as an alternative to the above formula (I), the optical frequency comb generator may be driven so as to satisfy the following formula (II):

$$\Delta A = \Delta \theta = \pi/4 \qquad (II)$$

In the above formula (II), definitions of $\Delta A$ and $\Delta \theta$ are the same as those of the above formula (I). Thus, the optical frequency comb generator 20 may be equipped with: the driving signal system 22 that drives the first driving signal 22a, the second driving signal 22b, and the bias signals 23a, 23b according to the above formula (II), and the bias signal system 23. Driving as shown in the formula (II) enables the optical frequency comb generator to efficiently obtain an optical frequency comb having flat spectral characteristics.

In addition, with respect to the optical frequency comb generator, it is preferable that an amplitude (A1) of the first driving signal 22a differ from an amplitude (A2) of the second driving signal 22b in the definitions of the above formulas (I) and (II).

Besides, design theories and production methods of the optical frequency comb generator are specifically disclosed in Unexamined Japanese Patent Publication No. 2007-248660. A configuration of an optical frequency comb generator disclosed in this document can be employed as appropriate in the photodetection device according to the present invention.

Moreover, the optical frequency comb is constituted of a plurality of optical frequency components having frequency differences at regular intervals. Further, it is ideal that the optical frequency comb has flat spectral characteristics, in other words, each optical frequency component has uniform light intensity. Meanwhile, it is not always necessary to make phases of all optical frequency components of the optical frequency comb uniform. In other words, frequency components that constitute the optical frequency comb may each have an arbitrary phase. Here, the concept of the optical frequency comb includes optical pulses in which phases of all optical frequency components are uniform. Optical pulses are one of preferred forms of the optical frequency comb. The optical frequency comb generator 20 may be configured to generate such optical pulses (phases of all optical frequency components are uniform).

When the photodetection device 100 resolves each optical signal train into individual wavelength domains, the optical frequency comb generator 20 shifts a wavelength of the local comb in time, enabling to cover the whole bands of the optical signal train (refer to FIG. 1). In contrast, when the photodetection device 100 resolves each optical signal train into individual time-wavelength domains, a wavelength of a local comb generated by the time optical frequency comb generator 20 may be constant with respect to the time (refer to FIG. 3). However, when each optical signal train is resolved into individual time-frequency domains, it is preferable that the phase relationship between optical frequency combs to be mixed with optical signal trains be an orthogonal relationship in which phases of the optical frequency combs are orthogonal to each other.

2-3. Optical Multi-Frequency Mixing Detector

Figure 7:
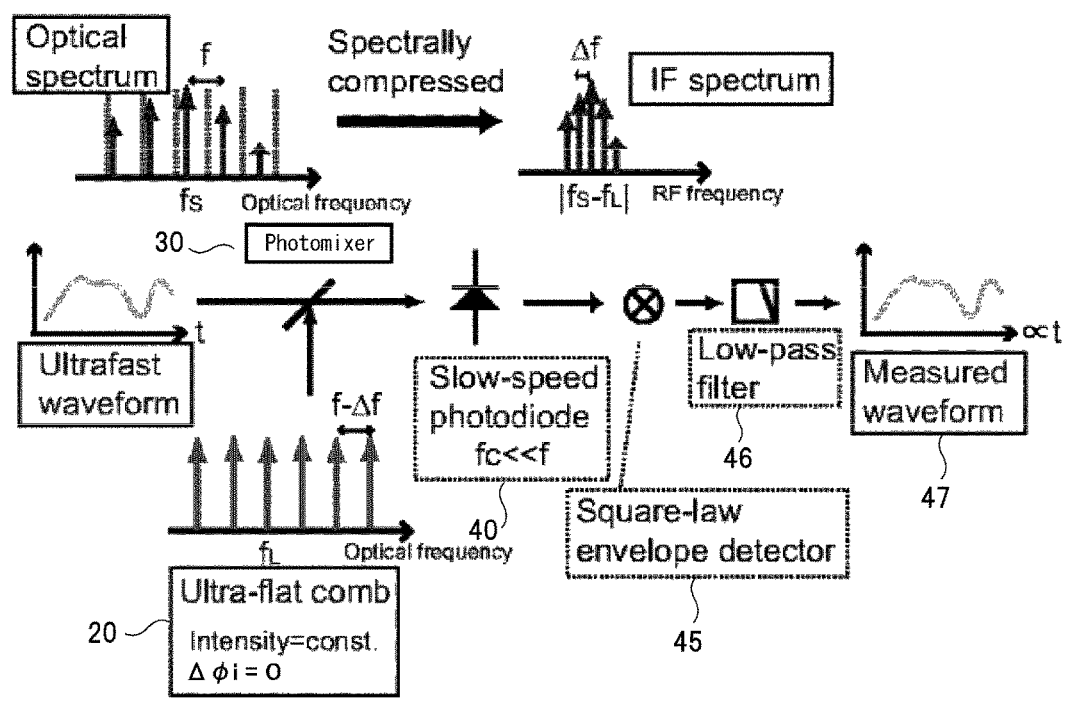
FIG. 7 illustrates a preferred form of a photodetector.

FIG. 7 specifically illustrates a preferred form of the photodetector 40. According to the present invention, the optical multi-frequency mixing detector is realized by the optical frequency comb generator 20, the photomixer 30 and the photodetector 40 described above. Optical multi-frequency mixing explained here is a detection technique that enables high-bandwidth optical sampling on the basis of wavelength domains or time-frequency domains by mixing (homodyne mixing) an optical signal as a detection object with a locally generated optical frequency comb (local comb). Here, an optical frequency comb having rectangle spectral characteristics is used as a local oscillator as an alternative to a Continuous Wave (CW) light source or a pulsed light source, thereby extracting sampling points of the optical signal on the basis of wavelength domains or time-frequency domains. The optical multi-frequency mixing detector subjects an ultrawide-band optical signal to band compression, and down-converts the band-compressed optical signal to an electric signal having a low-rate RF frequency.

As shown in FIG. 7, a system that relates to optical multi-frequency mixing detection is provided with the optical frequency comb generator 20, the photomixer 30 and the photodetector 40 (low-speed photodiode). In addition, it is preferable that this system be further provided with an envelope detector 41, an RF low-pass filter 42 and an RF detector 43.

As shown in FIG. 7, an optical signal (target signal) that is a detection object, and an optical frequency comb (local comb) output from the optical frequency comb generator 20, are input into the photomixer 30. Here, it can be said that the target signal in the photodetection device 100 according to the present invention is an optical signal train, the time of arrival at the photomixer 30 of which has been adjusted by the time delay adjustment unit 10. In other words, the photodetection device 100 according to the present invention first inputs an optical signal that is a detection object into the time delay adjustment unit 10, and generates a plurality of optical signal trains (the frequency and the strength are constant) that differ in timing of arrival at the photomixer 30. In addition, the time-adjusted optical signal trains are successively mixed with the optical frequency comb by the photomixer 30.

The photomixer 30 photomixes a target signal having a repetition rate of frequency f [Hz] with a local comb having frequency intervals of frequency f−Δf [Hz]. Here, Δf can be arbitrarily set. However, it is preferable that Δf<<f. In addition, when the photodetector 40 (photodiode) detects mixed waves obtained by photomixing the target signal with the local comb, the mixed waves are down-converted into an Intermediate Frequency (IF) having the low frequency. Here, the local comb has uniform intensity in terms of spectra, and thus heterodyne conversion efficiency for each frequency component of the target signal becomes uniform. Therefore, a spectrum replication of the target signal is generated as an electric signal in an IF band. From the frequency intervals of the target signal, frequency intervals of this electric signal become Δf that is highly compressed. In this manner, the photodetector 40 detects frequency differences between the target signal and the local comb that have been mixed by the photomixer 30, thereby enabling to obtain an IF signal having an RF frequency based on the frequency differences.

Moreover, when phase difference Δφi between frequency modes of the local comb is set at 0, phase relationship between frequency modes of the target signal is also maintained. In addition, the IF signal obtained by the photodetector 40 is input into the envelope detector 41. The envelope detector 41 is capable of detecting an envelope having a high similarity to a waveform of the target signal.

As described above, the repetition rate of the IF signal is Δf, and this Δf is much lower than the repetition rate f of the original target signal. Therefore, even when the target signal has an ultrahigh-speed waveform exceeding a limit of a bandwidth that can be detected by the photodetector 40 (low-speed photodiode), using optical multi-frequency mixing detection enables the photodetector 40 to detect the target signal. Moreover, according to this technique, performing envelope detection enables to cancel uncertainty of optical phase differences between a target signal and a local comb, and thus the technique has an advantage of eliminating the need for fixing optical phases of the target signal and the local comb. In other words, even when optical components constituting the target signal or the local comb have any kind of phase difference therebetween, amplitudes and phase differences can be collectively obtained by a general-purpose photodiode. The local comb does not need to be complete optical pulses (optical frequency comb in which phases of all optical frequency components are uniform). The optical frequency components that constitute the local comb can be configured to have arbitrary phases, respectively.

In addition, as shown in FIG. 7, the low-pass filter 42 removes remaining unnecessary noise components from the IF signal obtained by the photodetector 40, and the IF signal is then input into the RF detector 43. The RF detector 43 reconstructs a signal waveform of the target signal on the basis of a signal waveform of the IF signal. In particular, in the photodetection device 100 according to the present invention, a plurality of optical signal trains that have been time-adjusted by the time delay adjustment unit 10 are successively input into the photomixer 30 at different timings, and are then converted into an IF signal by the photodetector 40. Therefore, the RF detector 43 reconstructs a signal waveform of the first optical signal input into the time delay adjustment unit 10 on the basis of a signal waveform of the plurality of target signals. Incidentally, algorithm for reconstructing the signal waveform of the original optical signal from the plurality of time-adjusted target signals can be designed as appropriate.

Here, it is preferable that the optical frequency comb generator 20 for generating a local comb be driven so as to satisfy the following conditions. (1) First of all, it is preferable that each of frequency components that constitute a local comb has a phase difference of 0 (Δφi=0) therebetween, and constant frequency interval. (2) In addition, it is preferable that all frequency components that constitute a local comb signal have uniform light intensity. (3) Moreover, it is preferable that the center frequency (wavelength) and frequency intervals of the local comb signal can be flexibly and arbitrarily controlled. The optical frequency comb generator 20 that uses the above-described Mach-Zehnder optical modulator can be used as the optical frequency comb generator 20 that satisfies such conditions. In other words, the Mach-Zehnder optical frequency comb generator 20 functions as an electro-optic super-flat frequency comb generator, and is suitable for the use as a multifrequency local oscillator. As described above, the Mach-Zehnder optical frequency comb generator 20 is capable of stably generating an excellent optical frequency comb having the high spectrum flatness, and is capable of flexibly controlling the center frequency (wavelength) and frequency intervals of the obtained optical frequency comb. In addition, according to this optical frequency comb generator 20, it is also possible to generate a super-flat frequency comb having a THz-level bandwidth. Therefore, it can also be expected that picosecond-level time resolution is exhibited.

As described above, in a case where each optical signal train is resolved into individual time-frequency domains (refer to FIG. 3), it is preferable that a time delay in the loop-type optical fiber delayer 12 be set at (m+i/n)/B [sec] in order to maintain the orthogonality of the optical frequency comb to be mixed with each time-adjusted optical signal train. Even when a phase difference Δφi between frequency modes of the optical frequency comb is not 0, setting a time delay in this manner ensures an orthogonal relationship of each optical frequency comb to be mixed with each optical signal train, thereby enabling to resolve the optical signal train into individual time-frequency domains. Consequently, this eliminates the need for, for example, the operation of shifting, in time, a wavelength (central wavelength) of the optical frequency comb output from the optical frequency comb generator 20.

Moreover, as described above, an optical frequency comb having an arbitrary phase difference Δφi can be applied as a local comb, and therefore it is not necessary to use complete optical pulses (optical frequency comb in which phases of all optical frequency components are uniform). Therefore, according to the present invention, a photodetection device (oscilloscope) that has a simpler configuration without depending on complicated optical pulses can be provided.

3. Examples

Figure 8:
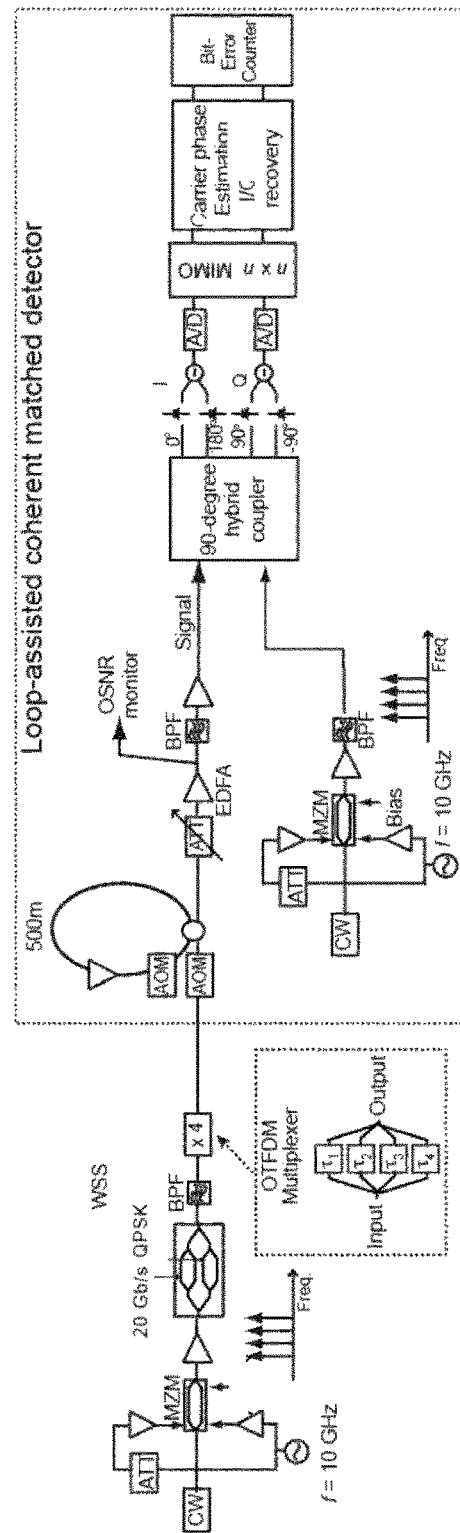
FIG. 8 illustrates an embodiment of the photodetection device according to the present invention.
Figure 9:
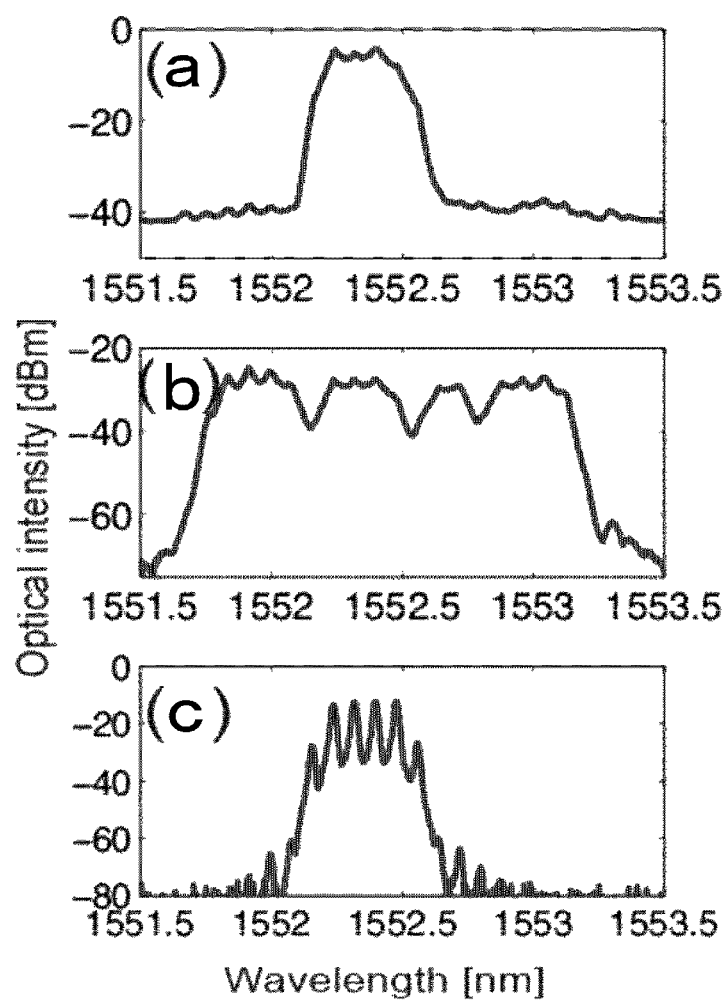
FIG. 9(a) illustrates an optical spectrum of a 4×20-Gb/s OTFDM-QPSK signal.
FIG. 9(b) illustrates an optical spectrum of a flexible grid signal that carries a plurality of OTFDM bundles that have different bandwidths.
FIG. 9(c) illustrates an optical spectrum of a local comb.

Subsequently, examples of a photodetection device according to the present invention will be described with reference to FIG. 8 to FIG. 11. FIG. 8 illustrates a configuration of a photodetection device according to an example. The example shown in FIG. 8 corresponds to the example of the photodetection device 100 shown in FIG. 5.

In the present example, a four-channel time-frequency domain multiplexed (OTFDM: Orthogonal Time-Frequency Domain Multiplexing) signals has been generated on the transmitter side. The communication speed of the OTFDM signal has been 4×20 Gb/s. Here, the "OTFDM signal" is a multi-carrier signal having a spectral efficiency that is the same level as that of OFDM [Reference literature: Takahide Sakamoto, Orthogonal Time-Frequency Domain Multiplexing with Multilevel Signaling, Optics Express, Vol. 22, Issue 1, pp. 773-781 (2014)]. In the present example, an OTFDM signal has been generated as an example of the multi-carrier optical signal, and this OTFDM signal has been used as a test signal.

On the transmitter side, first of all, continuous light (CW laser) output from a light source has been input into a Mach-Zehnder modulator flat optical frequency comb generator (MZ-FCG), and an optical frequency comb signal having a frequency of 18×10 GHz has been generated. The obtained optical frequency comb signal has been input into a Mach-Zehnder optical modulator in a subsequent stage, and then the Mach-Zehnder optical modulator has subjected the optical frequency comb signal to optical modulation having a QPSK format. The optical modulation having the QPSK format has a symbol rate of a 10 giga baud having a pattern length of $2^{15}-1$. Here, all optical components (comb lines) included in the optical frequency comb signal had been modulated with the same data stream. The QPSK-modulated optical frequency comb signal has been filtered by a band-pass filter having a rectangular pass band of 40 Gb/s, and subsequently has been introduced into a delay-line-based 4×OTFDM multiplexer for generating an OTFDM signal. In the present example, an 80-Gb/s OTFDM-QPSK signal having a bandwidth of 40 GHz has been generated by such a configuration.

In contrast, on the receiver side, a loop-supporting optical multi-frequency mixing detector has been constructed. An ultrawide-band OTFDM-QPSK signal generated as above has been input into a loop section (time delay adjustment unit). The loop section is composed of a single mode optical fiber (SMF) having a length of 500 m, an optical amplifier (EDFA), and an ultrasonic optical switch (AOM switch) that functions as a time gate. The OTFDM-QPSK signal that is the detection object has been input into the loop section (500 m) of an optical fiber through the AOM switch. In the loop section, the OTFDM-QPSK signal has been time-adjusted (time gate) by a timing window of 1 µs, and then has been readjusted (time delay) by circulation through a SM loop eight times. After the recirculation loop, four sets of optical signal trains (received signal) from among eight sets of optical signal trains have been subjected to a timing delay of 100 m+25i [ps], and then have been input into a signal port of a hybrid coupler.

Meanwhile, a local comb has been generated by use of another Mach-Zehnder modulator flat optical frequency comb generator (MZ-FCG). This local comb is input into the other port of the hybrid coupler. The number of comb lines of the local comb is four, which covers all bandwidths of an 80-Gb/s OTFDM-QPSK signal. With respect to the settings in the present example, a relative optical delay between the received signal (OTFDM-QPSK signal) and the local comb is 25i [ps], and this value ensures the orthogonality between the multi-carrier received signal and the local comb.

The recirculated received signal (OTFDM-QPSK signal) has been homodyne mixed with the local comb on the basis of offline signal processing by use of a typical digital homodyne receiver. In addition, in order to demodulate the QPSK signal to perform photodetection, a typical balanced photodetector is mounted to the subsequent stage of the hybrid coupler. An n×n MIMO (4×4 MIMO) is mounted so as to cancel the residual crosstalk remaining between subchannels included in the received signal.

Figure 10:
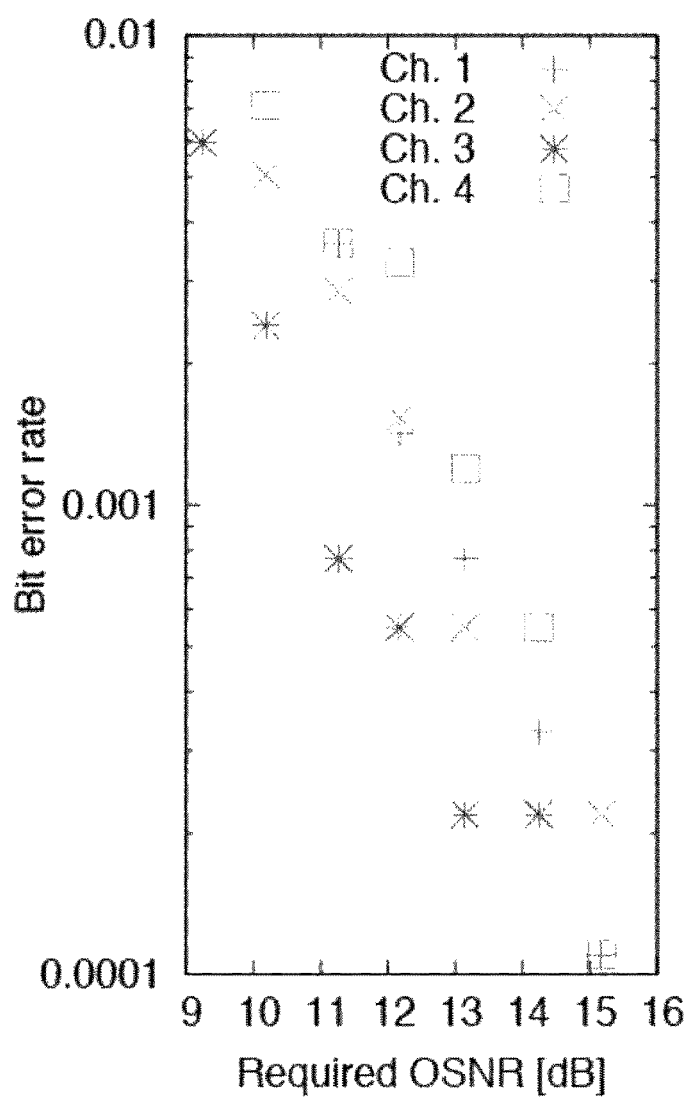
FIG. 10 illustrates bit error rates measured for required OSNR.

FIG. 9(a) illustrates an optical spectrum of a 4×20-Gb/s OTFDM-QPSK signal. In addition, FIG. 9(c) illustrates an optical spectrum of a local comb having four comb lines. Moreover, FIG. 10 illustrates bit error rate characteristics of a channel after demultiplexing, the bit error rates having been measured as a function of OSNR received at 0.1 nm. Required OSNR@BER=10e-3 has been 11.5 to 13.5 dB. This value has been close to the theoretically expected and desired OSNR that is 12 dB. As a reason of dispersing as shown in FIG. 10, it is considered that unbalanced power of multiplexed subchannels is a main cause.

Figure 11:
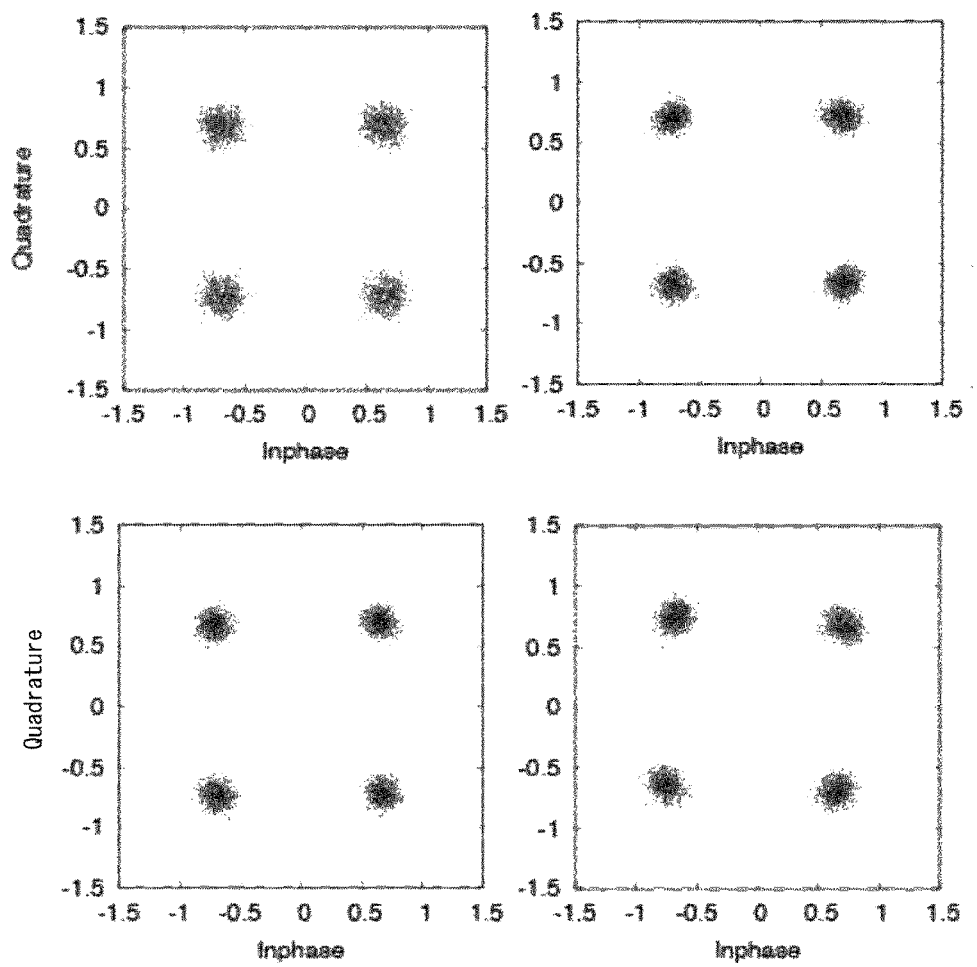
FIG. 11 illustrates constellations related to a demultiplexed QPSK signal.

In addition, in the present example, in order to show the channel selectivity of the photodetection device, a flexible grid signal for carrying a plurality of OTFDM bundles that have different bandwidths has been measured as shown in FIG. 9(b). In the present example, a quadrupled wavelength band has been measured between OTFDM bundles. FIG. 11 illustrates constellations obtained by measuring all individually detected subchannels. As shown in FIG. 11, a constellation of each subchannel is clearly observed. Therefore, according to the present example, it could have been determined that all channels are normally separated and demodulated without the occurrence of serious crosstalk.

As described above, the present example has demonstrated a loop-supporting parallel coherent matched detector capable of concurrently measuring all subchannels of a multi-carrier optical signal. In other words, according to the detector of the present example, it has been experimentally demonstrated that the 4×20-Gb/s OTFDM-QPSK signal can be correctly detected by demultiplexing.

As stated above, in the description of the present application, the examples of the present invention have been explained with reference to the drawings in order to express the contents of the present invention. However, the present invention is not limited to the above examples, but includes changes and improvements that are obvious to those skilled in the art on the basis of the matters stated in the description of the present application.

INDUSTRIAL APPLICABILITY

The present invention relates to a photodetection device and a photodetection method, each of which is capable of collectively measuring ultrawide-band optical signals that exceed an electrical band limit. The techniques of the present invention can be applied to, for example, oscilloscopes.

In addition, in order to analyze a highly multiplexed optical network signal, a technique for coherent multidimensional optical measurement that supports a multiplexed axis of light and the flexibility needs to be established. In this case, parallelization and multidimensionality are important keys. However, the present invention has advantages in parallelization and integration. Moreover, when functions are parallelized, many main parts such as an optical signal generation section and an optical detection section can be standardized. The present invention exhibits an effect of performing higher-order multidimensional optical measurement while preventing an optical measurement system from being complicated.

REFERENCE SIGNS LIST

10 Time delay adjustment unit
11 Time gate switch
12 Loop-type optical fiber delayer
20 Optical frequency comb generator
21 Waveguide section
21a Input part
21b Branch part
21c First waveguide
21d Second waveguide
21e Multiplexing part
21f Output part
22 Driving signal system
22a First driving signal
22b Second driving signal
23 Bias signal system
30 Photomixer
40 Photodetector
41 Low-pass filter
42 A/D converter
43 S/P converter
44 MIMO detector
45 Envelope detector
46 Low-pass filter
47 RF detector
100 Photodetection device

The invention claimed is:

1. A photodetection device comprising:
a time delay adjustment unit (10) into which an optical signal that is a detection object is input;
an optical frequency comb generator (20) that generates an optical frequency comb;
a photomixer (30) that photomixes time-adjusted optical signal trains successively output from the time delay adjustment unit (10) with an optical frequency comb signal output from the optical frequency comb generator (20); and
a photodetector (40) that detects the mixed signal output from the photomixer (30),
wherein the time delay adjustment unit (10) time-adjusts the optical signal trains in such a manner that each of the time-adjusted optical signal trains is photomixed with the optical frequency comb at different timings in the photomixer (30).

2. The photodetection device according to claim 1, wherein
the time delay adjustment unit (10) comprises a time gate switch (11) that obtains an optical signal train that falls within a predetermined time domain from the optical signal, and outputs the obtained optical signal train to the photomixer (30), and a loop-type optical fiber delayer (12) that time-delays the optical signal including a part that has not been obtained by the time gate switch (11), and inputs the time-delayed optical signal into the time gate switch (11) again.

3. The photodetection device according to claim 1, wherein
the photodetector detects frequency differences between components of the optical signal train and components of the optical frequency comb, the optical signal train and the optical frequency comb being included in the mixed signal, so as to obtain an electric signal, the frequency of which is based on the frequency differences.

4. The photodetection device according to claim 1, wherein
a number of the photomixers (30) into which the optical signal trains output from the time delay adjustment unit (10) are input, and a number of the photodetectors (40) into which the mixed signal output from the photomixer (30) is input, are both one.

5. A photodetection method comprising the steps of:
inputting an optical signal that is a detection object into a time delay adjustment unit (10);
generating an optical frequency comb by an optical frequency comb generator (20);
photomixing, by a photomixer (30), time-adjusted optical signal trains successively output from the time delay adjustment unit (10) with an optical frequency comb signal output from the optical frequency comb generator (20); and
detecting, by a photodetector (40), a mixed signal output from the photomixer (30),
wherein the time delay adjustment unit (10) time-adjusts the optical signal trains in such a manner that each of the time-adjusted optical signal trains is photomixed with the optical frequency comb at different timings in the photomixer (30).

\* \* \* \* \*